(12) United States Patent
Teraoka (10) Patent No.: US 9,618,725 B2
(45) Date of Patent: Apr. 11, 2017

(54) IMAGING LENS ASSEMBLY

(71) Applicant: Hiroyuki Teraoka, Shenzhen (CN)

(72) Inventor: Hiroyuki Teraoka, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 200 days.

(21) Appl. No.: 14/701,617

(22) Filed: May 1, 2015

(65) Prior Publication Data

US 2016/0048003 A1 Feb. 18, 2016

(30) Foreign Application Priority Data

Aug. 13, 2014 (JP) .................. 2014-164693

(51) Int. Cl.
  *G02B 9/62* (2006.01)
  *G02B 13/00* (2006.01)
(52) U.S. Cl.
  CPC ........... *G02B 9/62* (2013.01); *G02B 13/0045* (2013.01)

(58) Field of Classification Search
  CPC ............................. G02B 9/62; G02B 13/0045
  USPC ................................ 359/708, 713, 755–757
  See application file for complete search history.

(56) References Cited

FOREIGN PATENT DOCUMENTS

| JP | 2013-242449 | 12/2013 | |
|---|---|---|---|
| JP | 2014-044732 | 3/2014 | |
| WO | WO2016109956 | * 7/2016 | ............. G02B 13/18 |

* cited by examiner

*Primary Examiner* — Zachary Wilkes
*Assistant Examiner* — George G King
(74) *Attorney, Agent, or Firm* — Na Xu; IPro, PLLC (57) ABSTRACT

An imaging lens assembly includes, arranged in succession from an object side to an image side, a first lens L1 having a positive refractive power, a second lens L2 having a negative refractive power, a third lens L3 having a negative refractive power, a fourth lens L4 having a positive or a negative refractive power, a fifth lens L5 having a positive refractive power, and a sixth lens L6 having a negative refractive power.

6 Claims, 7 Drawing Sheets

IMAGING LENS ASSEMBLY

FIELD OF THE INVENTION

The present invention relates to an imaging lens assembly, and more particularly to an imaging lens assembly which is suitable for installation into an image input device of a portable telephone or personal computer, a digital camera, a CCD or CMOS camera used for monitoring purposes, a surveying device, or similar.

DESCRIPTION OF RELATED ART

Imaging apparatuses using solid-state image sensing devices such as CCD (Charge-Coupled Device) type image sensors and CMOS (Complementary Metal-Oxide Semiconductor) type image sensors include digital still cameras, digital video cameras, and the like. Imaging apparatuses using such solid-state image sensing devices are suitable for miniaturization, and hence have recently been mounted in compact information terminals such as cellular phone sets.

With increases in the miniaturization and pixel density of solid-state image sensing devices, demands have arisen for smaller and higher-performance imaging lenses to be mounted in these imaging apparatuses. In this disclosure, An imaging lenses assembly used for such an application includes, arranged in succession from the object side to the image side: a first lens having a positive refracting power, a second lens having a negative refractive power, a third lens having a negative refractive power, a fourth lens having a positive or a negative refractive power, a fifth lens having a positive refractive power, and a sixth lens having a negative refractive power.

The imaging lens assembly disclosed in Japanese Patent Application Publication No. JP2013-242449 is of a type which has the aforementioned six lenses, in which, the shape of the forth lens, and the ratio of the axial distance from the image side surface of the fifth lens to the object side surface of the sixth lens and the focal length of the whole imaging lens assembly are not properly designed, and thus it may facilitate less for achieving a wide angle and a better F number ((hereafter referred to as Fno) for the imaging lens assembly.

Japanese Patent Application Publication No. JP2014-044372 discloses another type of imaging lens assembly, which also includes the aforementioned six lenses, while the second, third and fourth lenses are all not shaped properly, and the ratio of the axial distance from the image side surface of the fifth lens to the object side surface of the sixth lens and the focal length of the whole imaging lens assembly are also not properly designed, so the imaging lens assembly may also not able to achieve a wide angle and a better Fno value.

Accordingly, an improved imaging lens which can overcome the disadvantages described above is desired.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to several embodiments.

Figure 1:
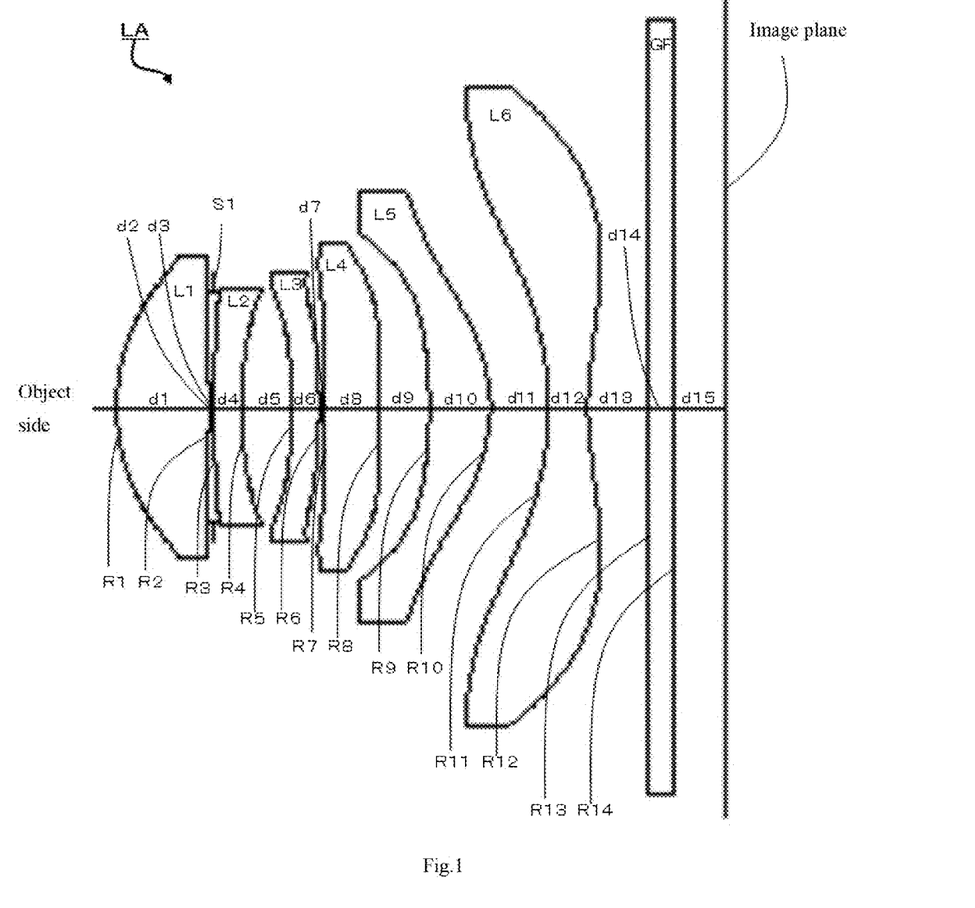
FIG. 1 is an illustrative structure of an imaging lens assembly related to the present invention.

Referring to FIG. 1, an imaging lens assembly LA related to the present invention includes, from an object side to an image side, a first lens L1, an aperture stop S1, a second lens L2, a third lens L3, a fourth lens L4, a fifth lens L5, and a sixth lens L6. A glass plate GF is arranged between the sixth lens L6 and the image plane. The glass plate GF may be a cover glass, an IR filter, or a low frequency filter. Alternatively, the glass plate may be arranged at other position.

The first lens L1 has a positive refractive power, the second lens L2 has a negative refractive power, the third lens L3 has a negative refractive power, the fourth lens L4 has a positive or a negative refractive power, the fifth lens L5 has a positive refractive power, and the sixth lens L6 has a negative refractive power. With the configuration of the refractive powers of the lenses, the imaging lens assembly LA may be miniaturized. Further, for correcting aberrations appropriately, these six lenses are configured to be aspherical.

The imaging lens assembly LA satisfies the following conditions (1)-(4):

$$1.40 \leq (R3+R4)/(R3-R4) \leq 2.00 \tag{1}$$

$$-60.00 \leq (R5+R6)/(R5-R6) \leq -1.00 \tag{2}$$

$$-2.20 \leq (R7+R8)/(R7-R8) \leq -0.05 \tag{3}$$

$$0.06 \leq d11/f \leq 0.15 \tag{4}$$

Where:
R3 is a curvature radius of the object side of the second lens L2;
R4 is a curvature radius of the image side of the second lens L2;
R5 is a curvature radius of the object side of the third lens L3;
R6 is a curvature radius of the image side of the third lens L3;
R7 is a curvature radius of the object side of the fourth lens L4;
R8 is a curvature radius of the image side of the fourth lens L4;
d11 is an axial distance between the image side of the fifth lens L5 to the object side of sixth lens L6;
f is a focal length of the imaging lens assembly LA.

Condition (1) prescribes the shape of the second lens L2. If the value fails to satisfy this condition, when Fno≤2.0, with the miniaturization and wide-angle development of the imaging lens assembly LA, it is difficult to correct aberrations, for example the on-axis chromatic aberrations. Besides, it may be advantageous that the imaging lens assembly LA satisfies the following condition (1-A):

$$1.60 \le (R3+R4)/(R3-R4) \le 2.00 \quad (1\text{-A})$$

Condition (2) prescribes the shape of the third lens L3. If the value fails to satisfy this condition, when Fno≤2.0, with the miniaturization and wide-angle development of the imaging lens assembly LA, it is difficult to correct the aberration, for example the ratio chromatic aberration. Besides, it may be advantageous if the imaging lens assembly LA satisfies the following condition (2-A):

$$-50.00 \le (R5+R6)/(R5-R6) \le -9.00 \quad (2\text{-A})$$

Condition (3) prescribes the shape of the fourth lens L4. If the value fails to satisfy this condition, when Fno≤2.0, with the miniaturization and wide-angle development of the imaging lens assembly LA, it is difficult to correct the off-axis aberrations. Besides, it may be advantageous if the imaging lens assembly LA satisfies the following condition (3-A):

$$-1.50 \le (R7+R8)/(R7-R8) \le -0.10 \quad (3\text{-A})$$

Condition (4) prescribes the ratio of the distance from the image side of the fifth lens L5 to the object side of sixth lens L6, and the focal length of the imaging lens assembly LA. If the value excesses the minimum limit, although it facilitates the miniaturization of the imaging lens assembly LA, it is difficult to correct the off-axis aberrations. If the value excesses the maximum limit, it adds difficulties to the miniaturization of the imaging lens assembly LA. Besides, it may be advantageous if the imaging lens assembly LA satisfies the following condition (4-A):

$$0.07 \le d11/f \le 0.12 \quad (4\text{-A})$$

Further, the imaging lens assembly LA satisfies the following conditions (5)-(6):

$$0.60 \le f1/f \le 0.80 \quad (5)$$

$$-1.20 \le (R1-R2)/(R1-R2) \le -0.80 \quad (6)$$

Where:
f is the focal length of the imaging lens assembly LA;
f1 is a focal length of the first lens L1;
R1 is a curvature radius of the object side of the first lens L1;
R2 is a curvature radius of the image side of the first lens L1.

Condition (5) prescribes the positive refractive power of the first lens L1. If the value excesses the minimum limit, although it facilitates the miniaturization of the imaging lens assembly LA, the positive refractive power of the first lens L1 is too powerful to correct image aberrations. If the value excesses the maximum limit, the positive refractive power of the first lens L1 is weakened and it is difficult to miniaturize the imaging lens assembly LA. Besides, it may be advantageous if the imaging lens assembly LA satisfies the following condition (5-A):

$$0.63 \le f1/f \le 0.73 \quad (5\text{-A})$$

Condition (6) prescribes the shape of the first lens L1. If the value fails to satisfy this condition, when Fno≤2.0, with the miniaturization and wide-angle development of the imaging lens assembly LA, it is difficult to correct the high order aberrations, for example spherical aberrations. Besides, it may be advantageous if the imaging lens assembly LA satisfies the following condition (6-A):

$$-1.10 \le (R1+R2)/(R1-R2) \le -0.90 \quad (6\text{-A})$$

Further, the imaging lens assembly LA satisfies the following condition (7):

$$-2.00 \le f2/f \le -1.10 \quad (7)$$

Where:
f is the focal length of the imaging lens assembly LA;
f2 is a focal length of the second lens L2.

Condition (7) prescribes the negative refractive power of the second lens L2. If the value fails to satisfy this condition, when Fno≤2.0, with the miniaturization and wide-angle development of the imaging lens assembly LA, it is difficult to correct the aberrations, for example on-axis chromatic aberrations. Besides, it may be advantageous if the imaging lens assembly LA satisfies the following condition (7-A):

$$-1.40 \le f2/f \le -1.10 \quad (7\text{-A})$$

The third lens L3 has a negative refractive power, and the imaging lens assembly LA further satisfies the following condition (8):

$$-70.00 \le f3/f \le -7.00 \quad (8)$$

Where:
f is the focal length of the imaging lens assembly LA;
f3 is a focal length of the third lens L3.

Condition (8) prescribes the negative refractive power of the third lens L3. If the value fails to satisfy this condition, when Fno≤2.0, with the miniaturization and wide-angle development of the imaging lens assembly LA, it is difficult to correct the aberrations, for example ratio chromatic aberrations. Besides, it may be advantageous if the imaging lens assembly LA satisfies the following condition (8-A):

$$-65.00 \le f3/f \le -8.00 \quad (8\text{-A})$$

The fourth lens L4 has a positive or a negative refractive power.

The fifth lens L5 has a positive refractive power, and the imaging lens assembly LA further satisfies the following conditions (9)-(10):

$$0.50 \le f5/f \le 0.80 \quad (9)$$

$$1.60 \le (R9+R10)/(R9-R10) \le 3.00 \quad (10)$$

Where:
f is the focal length of the imaging lens assembly LA;
f5 is a focal length of the fifth lens L5;
R9 is a curvature radius of the object side of the fifth lens L5;

R10 is a curvature radius of the image side of the fifth lens L5.

Condition (9) prescribes the positive refractive power of the fifth lens L5. If the value fails to satisfy this condition, when Fno≤2.0, with the miniaturization and wide-angle development of the imaging lens assembly LA, it is difficult to correct the high order aberrations, for example spherical aberrations. Besides, it may be advantageous if the imaging lens assembly LA satisfies the following condition (9-A):

$$0.60 \leq f5/f \leq 0.75 \quad (9\text{-}A)$$

Condition (10) prescribes the shape of the fifth lens L5. If the value fails to satisfy this condition, when Fno≤2.0, with the miniaturization and wide-angle development of the imaging lens assembly LA, it is difficult to correct the high order aberrations, for example spherical aberrations. Besides, it may be advantageous if the imaging lens assembly LA satisfies the following condition (10-A):

$$1.70 \leq (R9+R10)/(R9-R10) \leq 2.30 \quad (10\text{-}A)$$

The sixth lens L6 has a negative refractive power, and the imaging lens assembly LA further satisfies the following conditions (11)-(12):

$$-1.00 \leq f6/f \leq -0.40 \quad (11)$$

$$0.05 \leq (R11+R12)/(R11-R12) \leq 0.80 \quad (12)$$

Where:
f is the focal length of the imaging lens assembly LA;
f6 is a focal length of the sixth lens L6;
R11 is a curvature radius of the object side of the sixth lens L6;
R10 is a curvature radius of the image side of the sixth lens L6.

Condition (11) prescribes the negative refractive power of the sixth lens L6. If the value fails to satisfy this condition, when Fno≤2.0, with the miniaturization and wide-angle development of the imaging lens assembly LA, it is difficult to correct the aberrations, for example the curvature of field. Besides, it may be advantageous if the imaging lens assembly LA satisfies the following condition (11-A):

$$-0.70 \leq f6/f \leq -0.50 \quad (11\text{-}A)$$

Condition (12) prescribes the shape of the sixth lens L6. If the value fails to satisfy this condition, when Fno≤2.0, with the miniaturization and wide-angle development of the imaging lens assembly LA, it is difficult to correct the aberrations, for example the curvature of field. Besides, it may be advantageous if the imaging lens assembly LA satisfies the following condition (12-A):

$$0.07 \leq (R11+R12)/(R11-R12) \leq 0.72 \quad (12\text{-}A)$$

By virtue of the configurations and conditions set forth in the forgoing description, an improved imaging lens assembly LA having the characteristics of wide-angle, miniaturization, TTL/IH≤1.6, 2ω≥74°, and Fno (F number)≤2.0, is accordingly obtained.

Hereinafter, detailed embodiments will be described to test and verify the conditions set forth in the above descriptions.

The parameters of the imaging lens assembly LA are defined as follows, and the unit of each of the distance, radius, and thickness is millimeter (mm).

f: the focal length of the imaging lens assembly LA;
f1: the focal length of the first lens L1;
f2: the focal lens of the second lens L2;
f3: the focal lens of the third lens L3;
f4: the focal lens of the fourth lens L4;
f5: the focal lens of the fifth lens L5;
f6: the focal lens of the sixth lens L6;
Fno: F number 2ω: full visual angle
S1: aperture stop
R: curvature radius
R1: the curvature radius of the object side surface of the first lens L1;
R2: the curvature radius of the image side surface of the first lens L1;
R3: the curvature radius of the object side surface of the second lens L2;
R4: the curvature radius of the image side surface of the second lens L2;
R5: the curvature radius of the object side surface of the third lens L3;
R6: the curvature radius of the image side surface of the third lens L3;
R7: the curvature radius of the object side surface of the fourth lens L4;
R8: the curvature radius of the image side surface of the fourth lens L4;
R9: the curvature radius of the object side surface of the fifth lens L5;
R10: the curvature radius of the image side surface of the fifth lens L5;
R11: the curvature radius of the object side surface of the sixth lens L6;
R12: the curvature radius of the image side surface of the sixth lens L6;
R13: the curvature radius of the object side surface of the glass plate GF;
R14: the curvature radius of the image side surface of the glass plate GF;
d: axial thickness of the lens, or distance between lenses;
d1: the axial thickness of the first lens L1;
d2: the axial distance between the image side surface of the first lens L1 and the aperture stop S1;
d3: the axial distance between the aperture stop S1 and the object side surface of the second lens L2;
d4: the axial thickness of the second lens L2;
d5: the axial distance between the image side surface of the second lens L2 and the object side surface of the third lens L3;
d6: the axial thickness of the third lens L3;
d7: the axial distance between the image side surface of the third lens L3 and the object side surface of the fourth lens L4;
d8: the axial distance of the fourth lens L4;
d9: the axial distance between the image side surface of the fourth lens L4 and the object side surface of the fifth lens L5;
d10: the axial thickness of the fifth lens L5;
d11: the axial distance between the image side surface of the fifth lens L5 and the object side surface of the sixth lens L6;
d12: the axial thickness of the sixth lens L6;
d13: the axial distance between the image side surface of the sixth lens L6 and the object side surface of the glass plate GF;
d14: the axial thickness of the glass plate GF;
d15: the axial distance between the image side surface of the glass plate GF and the image plane;
nd: d line refraction index
n1: d line refraction index of the first lens L1;
n2: d line refraction index of the second lens L2;
n3: d line refraction index of the third lens L3;
n4: d line refraction index of the fourth lens L4;
n5: d line refraction index of the fifth lens L5;
n6: d line refraction index of the sixth lens L6;
n7: d line refraction index of the glass plate GF;
v: abbe number
v1: abbe number of the first lens L1;

v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the glass plate GF;
TTL: the axial distance between the object side surface of the first lens L1 and the image plane (total track length);
LB: the axial distance between the image side surface of the fifth lens L5 and the image plane (including the axial thickness of the glass plate GF);
IH: image height.

$$y = (x^2/R)/[1+\{1-(k+1)(x^2/R^2)\}^{1/2}] + A4x^4 + A6x^6 + A8x^8 + A10x^{10} + A12x^{12} + A14x^{14} + A16x^{16} \quad \text{(Condition 13)}$$

Where, R is the axial curvature radius, k is the conic coefficient, A4~A16 are aspherical coefficients.

Optionally, each aspherical surface of each lens could be obtained according to condition (13). Of course, the aspherical surface may also be obtained according to other condition.

Embodiment 1

Figure 2:
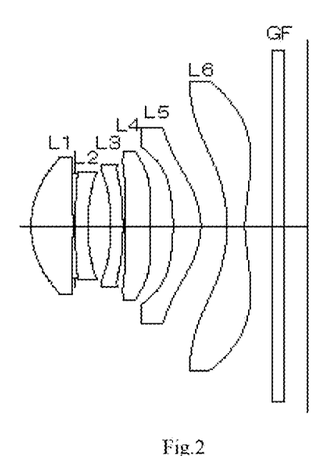
FIG. 2 is an illustrative structure of an imaging lens assembly related to a first embodiment of the present disclosure.

FIG. 2 shows an imaging lens assembly LA in accordance with Embodiment 1 of the present invention. Table 1 shows the detailed optical data of Embodiment 1. The conic coefficient and aspherical coefficient of the surfaces of the lenses of Embodiment 1 are listed in Table 2.

Figure 3:
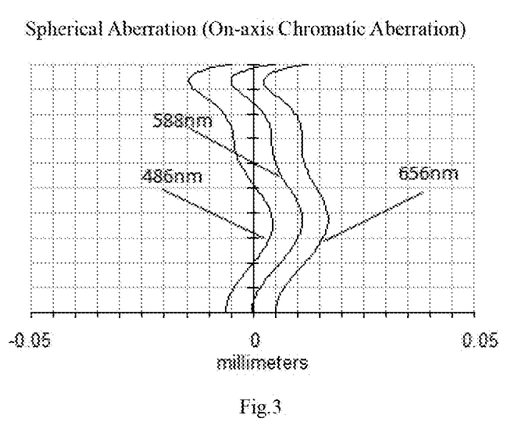
FIG. 3 is an aberration diagram showing spherical aberration (on-axis chromatic aberration) of the imaging lens assembly of the first embodiment.
Figure 4:
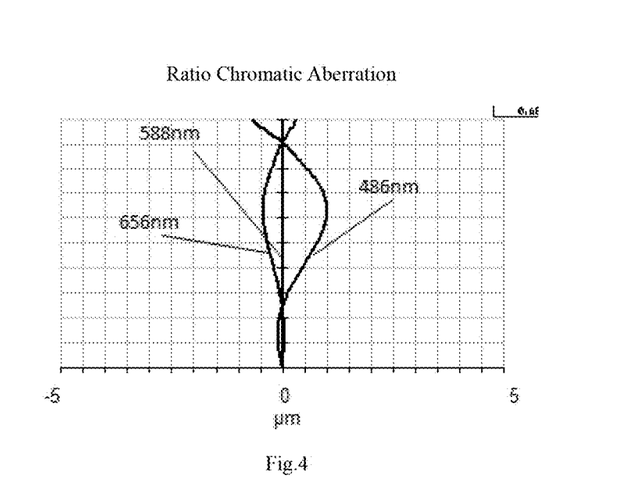
FIG. 4 is a ratio chromatic aberration diagram of the imaging lens assembly of the first embodiment.
Figure 5:
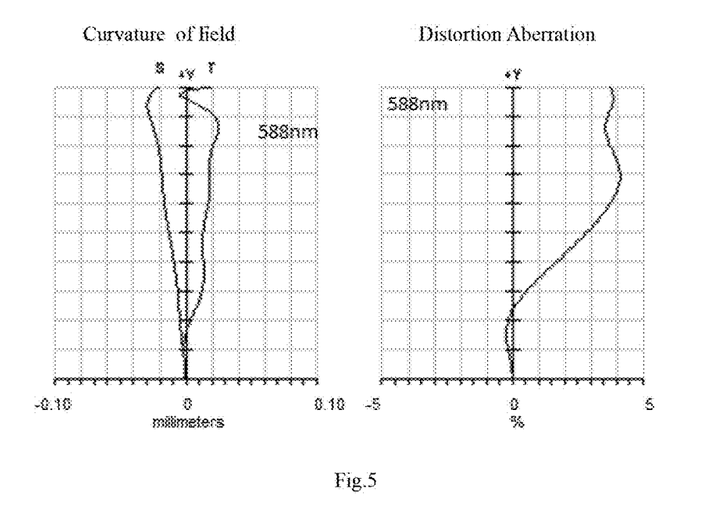
FIG. 5 is an aberration diagram showing the curvature of field and the distortion of the imaging lens assembly of the first embodiment.

Referring to subsequent Table 7, it shows all the parameters of the imaging lens assembly of the embodiments corresponding to conditions (1)-(12). As shown in Table 7, the imaging lens assembly LA of Embodiment 1 satisfies all of the conditions (1)-(12). The spherical aberration (on-axis chromatic aberration) of the imaging lens assembly LA of Embodiment 1 is shown in FIG. 3. The ratio chromatic aberration is shown in FIG. 4. The curvature of field and the distortion aberration are shown in FIG. 5. Wherein, S shows the curvature of field corresponding to sagittal image surface, and T shows the curvature of field corresponding to tangential image surface, and the embodiments 2-3 are the same. By virtue of the configuration, the imaging lens assembly LA of Embodiment 1 has the characteristics of wide-angle, miniaturization, 2ω=75.7°, TTL/IH=1.475, and Fno=1.90, and according to FIG. 3-FIG. 5, the good optical performance of the imaging lens assembly LA can be seen.

Embodiment 2

Figure 6:
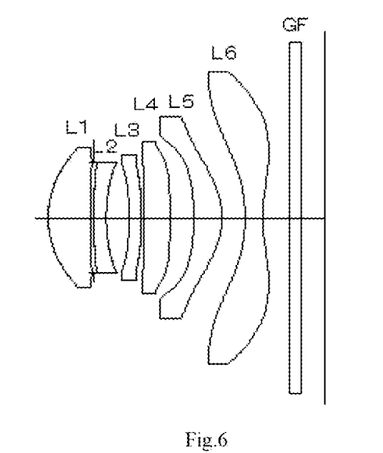
FIG. 6 is an illustrative structure of an imaging lens assembly related to a second embodiment of the present disclosure.

FIG. 6 shows an imaging lens assembly LA in accordance with Embodiment 2 of the present invention. Table 3 shows the detailed optical data of Embodiment 2. The conic coefficient and aspherical coefficient of the surfaces of the lenses of Embodiment 2 are listed in Table 4.

TABLE 1

|  | R | d |  | nd |  | vd |  |
|---|---|---|---|---|---|---|---|
| R1 | 1.69168 | d1 = | 0.760 | nd1 | 1.5441 | v1 | 56.12 |
| R2 | −42.35455 | d2 = | 0.030 |  |  |  |  |
| S1 | ∞ | d3 = | 0.015 |  |  |  |  |
| R3 | 12.48638 | d4 = | 0.225 | nd2 | 1.6510 | v2 | 21.51 |
| R4 | 2.95447 | d5 = | 0.420 |  |  |  |  |
| R5 | −4.63794 | d6 = | 0.225 | nd3 | 1.6510 | v3 | 21.51 |
| R6 | −5.50066 | d7 = | 0.050 |  |  |  |  |
| R7 | 16.79889 | d8 = | 0.455 | nd4 | 1.5441 | v4 | 56.12 |
| R8 | 86.79160 | d9 = | 0.410 |  |  |  |  |
| R9 | −4.28550 | d10 = | 0.510 | nd5 | 1.5441 | v5 | 56.12 |
| R10 | −1.25183 | d11 = | 0.475 |  |  |  |  |
| R11 | −2.92443 | d12 = | 0.330 | nd6 | 1.5441 | v6 | 56.12 |
| R12 | 2.33347 | d13 = | 0.500 |  |  |  |  |
| R13 | ∞ | d14 = | 0.210 | nd7 | 1.5168 | v7 | 64.17 |
| R14 | ∞ | d15 = | 0.440 |  |  |  |  |

TABLE 3

|  | R | d |  | nd |  | vd |  |
|---|---|---|---|---|---|---|---|
| R1 | 1.71056 | d1 = | 0.790 | nd1 | 1.5441 | v1 | 56.12 |
| R2 | −50.86334 | d2 = | 0.030 |  |  |  |  |
| S1 | ∞ | d3 = | 0.015 |  |  |  |  |
| R3 | 12.47239 | d4 = | 0.225 | nd2 | 1.6510 | v2 | 21.51 |
| R4 | 2.95117 | d5 = | 0.420 |  |  |  |  |
| R5 | −5.00427 | d6 = | 0.225 | nd3 | 1.6510 | v3 | 21.51 |
| R6 | −5.87825 | d7 = | 0.050 |  |  |  |  |
| R7 | 12.08679 | d8 = | 0.465 | nd4 | 1.5441 | v4 | 56.12 |
| R8 | 62.44572 | d9 = | 0.440 |  |  |  |  |
| R9 | −4.65373 | d10 = | 0.520 | nd5 | 1.5441 | v5 | 56.12 |
| R10 | −1.23157 | d11 = | 0.420 |  |  |  |  |
| R11 | −2.86555 | d12 = | 0.320 | nd6 | 1.5441 | v6 | 56.12 |
| R12 | 2.14699 | d13 = | 0.500 |  |  |  |  |
| R13 | ∞ | d14 = | 0.210 | nd7 | 1.5168 | v7 | 64.17 |
| R14 | ∞ | d15 = | 0.440 |  |  |  |  |

TABLE 2

|  | conic coefficient | aspherical coefficient | | | | | | |
|---|---|---|---|---|---|---|---|---|
|  | k | A4 | A6 | A8 | A10 | A12 | A14 | A16 |
| R1 | −4.5949E−01 | 6.3274E−03 | 1.5264E−02 | −1.0395E−02 | 2.4780E−04 | 3.9159E−03 | −8.5773E−04 | −1.0615E−03 |
| R2 | 8.2996E+02 | 2.0861E−02 | −1.9514E−03 | 3.0793E−03 | −1.6506E−02 | −1.3018E−03 | 1.4527E−02 | −6.4448E−03 |
| R3 | 4.8129E+01 | −5.3876E−03 | 1.4793E−02 | 2.0116E−02 | −4.4671E−02 | 9.4496E−04 | 4.1380E−02 | −1.7384E−02 |
| R4 | −2.4275E+00 | −3.8433E−03 | 1.2807E−02 | 2.0226E−02 | −2.5750E−02 | −3.3017E−02 | 6.5901E−03 | 4.9819E−02 |
| R5 | 1.8254E+01 | 9.4925E−03 | −6.1772E−02 | −7.0539E−02 | 3.4078E−02 | −2.0604E−03 | −5.9864E−02 | 9.1070E−02 |
| R6 | 2.1906E+01 | 3.4449E−03 | −2.9223E−02 | −3.6054E−03 | 2.1176E−02 | 1.4481E−02 | 5.1382E−03 | 3.8887E−04 |
| R7 | 0.0000E+00 | −8.6559E−02 | 6.6158E−03 | 7.8537E−03 | 2.2689E−03 | 2.3996E−03 | 1.2299E−03 | −1.1378E−03 |
| R8 | 0.0000E+00 | −7.7481E−02 | −1.5909E−02 | 1.5058E−02 | 2.0327E−02 | −1.5218E−03 | −4.0187E−04 | 1.1465E−03 |
| R9 | 4.3819E+00 | −2.5528E−02 | −2.1805E−02 | 1.0223E−02 | −7.7055E−03 | −1.6482E−03 | 5.4047E−04 | 5.2450E−04 |
| R10 | −3.7272E+00 | −6.1103E−02 | 2.8581E−02 | −1.4717E−03 | 7.1440E−04 | −3.6981E−04 | −7.4073E−05 | 2.4421E−05 |
| R11 | 0.0000E+00 | −1.5656E−02 | 8.3944E−03 | 4.1390E−05 | −9.3446E−05 | −4.6080E−06 | 5.3866E−07 | 8.1617E−08 |
| R12 | −2.1982E+01 | −4.2812E−02 | 9.0400E−03 | −1.6867E−03 | 1.1351E−04 | 2.7072E−06 | −2.7941E−08 | −4.6246E−08 |

TABLE 4

| | conic coefficient | aspherical coefficient | | | | | | |
|---|---|---|---|---|---|---|---|---|
| | k | A4 | A6 | A8 | A10 | A12 | A14 | A16 |
| R1 | −4.7056E−01 | 4.8633E−03 | 2.0019E−02 | −1.3072E−02 | −1.7521E−03 | 5.1796E−03 | 5.1800E−04 | −1.4941E−03 |
| R2 | −9.3352E+03 | 1.6985E−02 | −3.9310E−03 | 7.4040E−03 | −1.5839E−02 | −2.8569E−03 | 1.3301E−02 | −5.4005E−03 |
| R3 | 4.6031E+01 | 1.7888E−04 | 6.7971E−03 | 1.7546E−02 | −3.9179E−02 | 4.2183E−02 | 3.8115E−02 | −1.9859E−02 |
| R4 | −1.1777E+00 | −3.0121E−03 | 2.2202E−03 | 2.9544E−02 | −1.0539E−02 | −2.8319E−02 | −1.4444E−03 | 3.0968E−02 |
| R5 | 1.9617E+01 | 2.3507E−02 | −4.8752E−02 | −2.0138E−02 | 4.9782E−02 | 8.7619E−03 | −6.7853E−02 | 6.1009E−02 |
| R6 | 2.3766E+01 | 1.3491E−02 | −2.8882E−02 | 8.2470E−03 | 1.5004E−02 | 4.2260E−03 | 1.0177E−03 | 3.3452E−03 |
| R7 | 0.0000E+00 | −8.6507E−02 | 1.4384E−02 | 1.1990E−03 | −1.4989E−04 | 3.2687E−03 | 1.6135E−03 | −1.0527E−03 |
| R8 | 0.0000E+00 | −7.2602E−02 | −1.6662E−02 | 2.2984E−03 | 1.2180E−03 | −1.3020E−03 | −6.7333E−04 | 9.5399E−04 |
| R9 | 4.7146E+00 | −2.4232E−02 | −2.5013E−02 | 1.0532E−02 | −6.8189E−03 | −1.0264E−03 | 6.0671E−04 | 2.6263E−04 |
| R10 | −4.0990E+00 | −6.1458E−02 | 2.6160E−02 | −1.8396E−03 | 8.1068E−04 | −2.9452E−04 | −5.7128E−05 | 1.5833E−05 |
| R11 | 0.0000E+00 | −1.4580E−02 | 8.5162E−03 | 4.8507E−05 | −9.3934E−05 | −4.7417E−06 | 5.4131E−07 | 8.0377E−08 |
| R12 | −2.2076E+01 | −4.2257E−02 | 8.9152E−03 | −1.6895E−03 | 1.1587E−04 | 3.1438E−06 | −5.8328E−09 | −5.4126E−08 |

Figure 7:
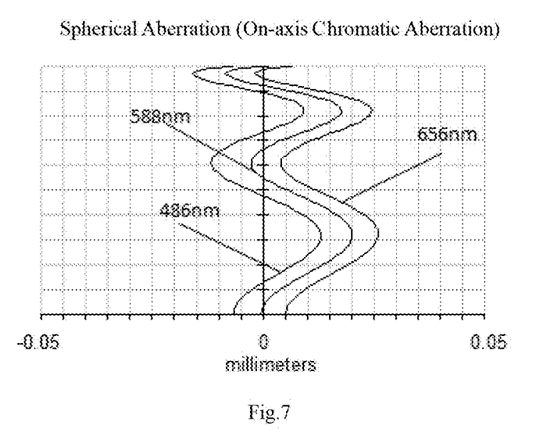
FIG. 7 is an aberration diagram showing spherical aberration (on-axis chromatic aberration) of the imaging lens assembly of the second embodiment.
Figure 8:
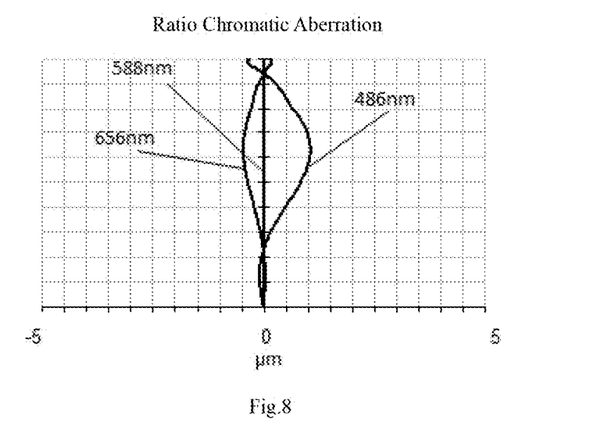
FIG. 8 is a ratio chromatic aberration diagram of the imaging lens assembly of the second embodiment.
Figure 9:
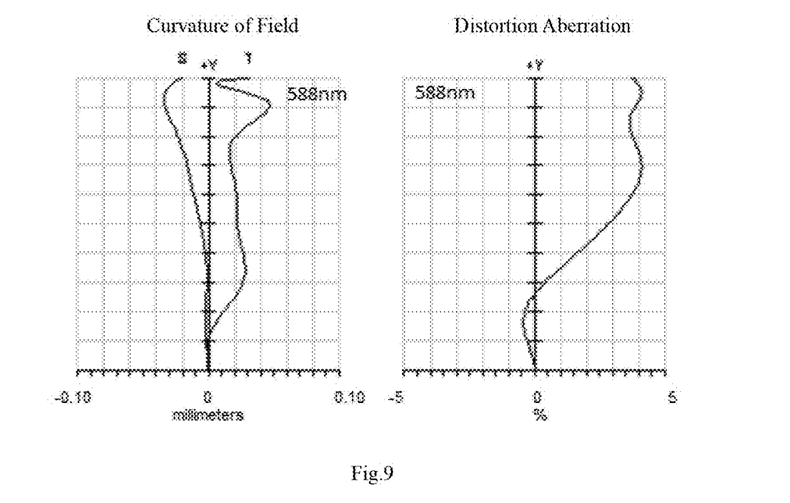
FIG. 9 is an aberration diagram showing the curvature of field and the distortion of the imaging lens assembly of the second embodiment.

As shown in Table 7, the imaging lens assembly LA of Embodiment 2 satisfies all of the conditions (1)-(12). The spherical aberration (on-axis chromatic aberration) of the imaging lens assembly LA of Embodiment 2 is shown in FIG. 7. The ratio chromatic aberration is shown in FIG. 8. The curvature of field and the distortion aberration are shown in FIG. 9. By virtue of the configuration, the imaging lens assembly LA of Embodiment 2 has the characteristics of wide-angle, miniaturization, 2ω=75.7°, TTL/IH=1.479, and Fno=1.80, and according to FIG. 7-FIG. 9, the good optical performance of the imaging lens assembly LA can be seen.

Embodiment 3

Figure 10:
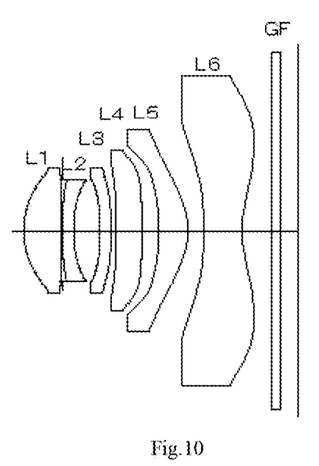
FIG. 10 is an illustrative structure of an imaging lens assembly related to a third embodiment of the present disclosure.

FIG. 10 shows an imaging lens assembly LA in accordance with Embodiment 3 of the present invention. Table 5 shows the detailed optical data of Embodiment 3. The conic coefficient and aspherical coefficient of the surfaces of the lenses of Embodiment 3 are listed in Table 6.

TABLE 5

| | R | d | | nd | | vd | |
|---|---|---|---|---|---|---|---|
| R1 | 1.70289 | d1 = | 0.760 | nd1 | 1.5441 | v1 | 56.12 |
| R2 | −1810.60870 | d2 = | 0.030 | | | | |
| S1 | ∞ | d3 = | 0.010 | | | | |
| R3 | 12.60094 | d4 = | 0.230 | nd2 | 1.6510 | v2 | 21.51 |
| R4 | 2.98208 | d5 = | 0.545 | | | | |
| R5 | −5.96443 | d6 = | 0.230 | nd3 | 1.6510 | v3 | 21.51 |
| R6 | −7.41847 | d7 = | 0.080 | | | | |
| R7 | 25.13465 | d8 = | 0.545 | nd4 | 1.5441 | v4 | 56.12 |
| R8 | 128.38692 | d9 = | 0.360 | | | | |
| R9 | −4.04791 | d10 = | 0.600 | nd5 | 1.5441 | v5 | 56.12 |

TABLE 5-continued

| | R | d | | nd | | vd | |
|---|---|---|---|---|---|---|---|
| R10 | −1.38663 | d11 = | 0.330 | | | | |
| R11 | −7.46333 | d12 = | 0.780 | nd6 | 1.5441 | v6 | 56.12 |
| R12 | 1.85098 | d13 = | 0.600 | | | | |
| R13 | ∞ | d14 = | 0.210 | nd7 | 1.5168 | v7 | 64.17 |
| R14 | ∞ | d15 = | 0.340 | | | | |

TABLE 6

| | conic coefficient | aspherical coefficient | | | | | | |
|---|---|---|---|---|---|---|---|---|
| | k | A4 | A6 | A8 | A10 | A12 | A14 | A16 |
| R1 | −4.1849E−01 | 3.7255E−03 | 1.9606E−02 | −9.3611E−03 | −1.0562E−02 | 5.0955E−03 | 7.8265E−03 | −5.1906E−03 |
| R2 | −1.5020E+18 | 2.9492E−02 | −2.0546E−02 | −6.1450E−04 | 1.2612E−02 | −1.9429E−03 | −1.7145E−02 | 7.8256E−03 |
| R3 | 1.2752E+02 | 2.1569E−02 | 7.7119E−04 | 1.6788E−02 | −1.6899E−02 | −4.4962E−03 | 6.4006E−03 | −4.0150E−03 |
| R4 | −1.1470E+00 | 1.0032E−02 | 9.0463E−03 | −5.8467E−02 | −2.3437E−02 | 4.6946E−02 | 2.6595E−02 | −3.4067E−02 |
| R5 | 3.0452E+01 | −1.4518E−02 | −2.9059E−02 | −6.1411E−02 | 1.0764E−01 | 3.5135E−02 | −1.1142E−01 | 4.7199E−02 |
| R6 | 3.0365E+01 | −7.8456E−04 | −7.0738E−02 | 3.4495E−02 | 1.2797E−02 | −2.1342E−04 | −3.0693E−04 | −1.5151E−03 |
| R7 | 0.0000E+00 | −3.3781E−02 | −1.2505E−02 | 1.6201E−03 | 2.9713E−03 | 9.0409E−04 | −2.3381E−04 | −1.0543E−04 |
| R8 | 0.0000E+00 | −3.3032E−02 | −5.7051E−03 | 2.3014E−04 | −7.5012E−04 | −5.2363E−04 | −7.9680E−05 | 1.2279E−04 |
| R9 | −1.7639E+01 | −1.0028E−02 | −1.6300E−02 | 6.9607E−03 | −1.9892E−03 | −5.2426E−04 | −9.7001E−06 | 7.0733E−05 |
| R10 | −3.8097E+00 | −1.7716E−02 | 9.5720E−03 | −1.8863E−03 | 2.9634E−04 | −3.8559E−05 | 3.2915E−06 | −2.4733E−07 |
| R11 | 0.0000E+00 | −2.3690E−02 | 4.4194E−03 | 3.3818E−05 | −2.5911E−05 | −6.5994E−07 | 1.1067E−07 | 7.1513E−10 |
| R12 | −1.0162E+01 | −2.5976E−02 | 4.8312E−03 | −6.5329E−04 | 3.1458E−05 | 1.7174E−07 | 2.7255E−08 | −3.7458E−09 |

Figure 11:
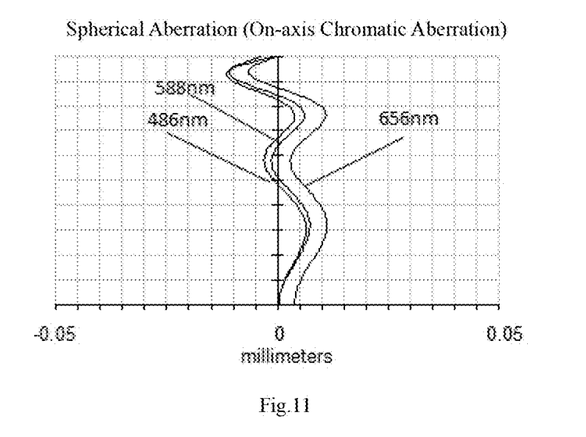
FIG. 11 is an aberration diagram showing spherical aberration (on-axis chromatic aberration) of the imaging lens assembly of the third embodiment.
Figure 12:
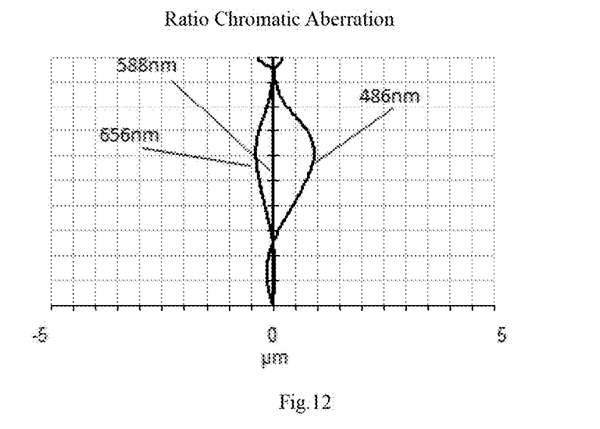
FIG. 12 is a ratio chromatic aberration diagram of the imaging lens assembly of the third embodiment.
Figure 13:
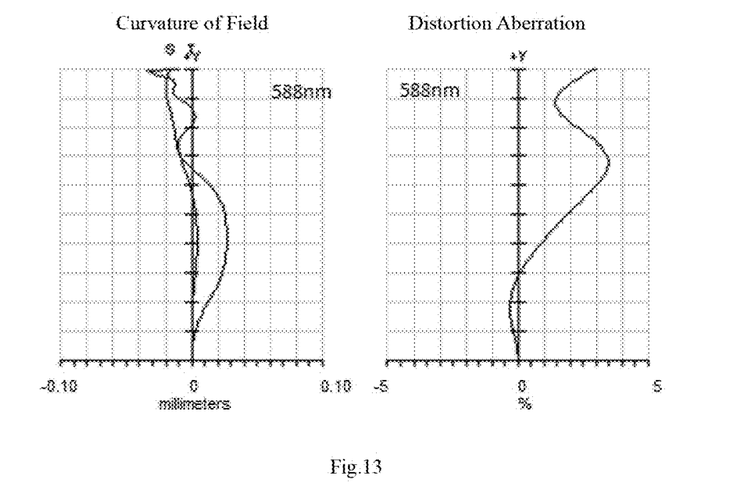
FIG. 13 is an aberration diagram showing the curvature of field and the distortion of the imaging lens assembly of the third embodiment.

Referring to Tables 5-6, and together with Table 7, the imaging lens assembly LA of Embodiment 3 satisfies conditions (1)~(12). The spherical aberration (on-axis chromatic aberration) of the imaging lens assembly LA of embodiment 3 is shown in FIG. 11. The ratio chromatic aberration is shown in FIG. 12. The curvature of field and the distortion aberration are shown in FIG. 13. By virtue of the configuration, the imaging lens assembly LA of Embodiment 3 has the characteristics of wide-angle, miniaturization, 2ω=77.0°, TTL/IH=1.464 mm, and Fno=1.9. According to FIG. 11-FIG. 13, the good optical performance of the imaging lens assembly LA can be seen.

Table 7 shows all the parameters of the imaging lenses of the embodiments corresponding to conditions (1)~(12), and the unit of each of lengths f1-f6, f, TTL, LB and IH is millimeter (mm).

TABLE 7

|  | Embodiment 1 | Embodiment 2 | Embodiment 3 | Remarks |
|---|---|---|---|---|
| (R3 + R4)/(R3 − R4) | 1.62 | 1.62 | 1.62 | Condition(1) |
| (R5 + R6)/(R5 − R6) | −11.75 | −12.45 | −9.2 | Condition(2) |
| (R7 + R8)/(R7 − R8) | −1.48 | −1.48 | −1.49 | Condition(3) |
| d11/f | 0.11 | 0.1 | 0.07 | Condition(4) |
| f1/f | 0.69 | 0.7 | 0.65 | Condition(5) |
| (R1 + R2)/(R1 − R2) | −0.92 | −0.93 | −1 | Condition(6) |
| f2/f | −1.38 | −1.38 | −1.26 | Condition(7) |
| f3/f | −11.64 | −13.25 | −10.41 | Condition(8) |
| f5/f | 0.71 | 0.67 | 0.75 | Condition(9) |
| (R9 + R10)/(R9 − R10) | 1.83 | 1.72 | 2.04 | Condition(10) |
| f6/f | −0.54 | −0.51 | −0.55 | Condition(11) |
| (R11 + R12)/(R11 − R12) | 0.11 | 0.14 | 0.6 | Condition(12) |
| Fno | 1.9 | 1.8 | 1.9 | |
| 2ω | 75.7 | 75.7 | 77 | |
| TTL/IH | 1.475 | 1.479 | 1.464 | |
| f | 4.3485 | 4.3429 | 4.79 | |
| f1 | 3.008 | 3.0577 | 3.1273 | |
| f2 | −6.0013 | −5.9947 | −6.0584 | |
| f3 | −50.634 | −57.5469 | −49.8567 | |
| f4 | 38.1972 | 27.4566 | 57.3333 | |
| f5 | 3.0684 | 3.0577 | 3.1273 | |
| f6 | −2.337 | −2.2062 | −2.6477 | |
| TTL | 5.055 | 5.07 | 5.65 | |
| LB | 1.15 | 1.15 | 1.15 | |
| IH | 3.428 | 3.428 | 3.8592 | |

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An imaging lens assembly LA comprising, arranged in succession from an object side to an image side:
    a first lens L1 having a positive refractive power,
    a second lens L2 having a negative refractive power,
    a third lens L3 having a negative refractive power,
    a fourth lens L4 having a positive or a negative refractive power,
    a fifth lens L5 having a positive refractive power,
    and a sixth lens L6 having a negative refractive power,
    wherein the following conditions (1)~(4) are satisfied:

$$1.40 \leq (R3+R4)/(R3-R4) \leq 2.00 \tag{1}$$

$$-60.00 \leq (R5+R6)/(R5-R6) \leq -1.00 \tag{2}$$

$$-2.20 \leq (R7+R8)/(R7-R8) \leq -0.05 \tag{3}$$

$$0.06 \leq d11/f \leq 0.15 \tag{4}$$

where,
R3 is a curvature radius of the object side of the second lens L2;
R4 is a curvature radius of the image side of the second lens L2;
R5 is a curvature radius of the object side of the third lens L3;
R6 is a curvature radius of the image side of the third lens L3;
R7 is a curvature radius of the object side of the fourth lens L4;
R8 is a curvature radius of the image side of the fourth lens L4;
d11 is an axial distance between the image side of the fifth lens L5 and the object side of sixth lens L6;
f is a focal length of the imaging lens assembly LA.

2. The imaging lens assembly LA as claimed in claim 1 further satisfying the following conditions (5)~(6):

$$0.60 \leq f1/f \leq 0.80 \tag{5}$$

$$-1.20 \leq (R1+R2)/(R1-R2) \leq -0.80 \tag{6}$$

Where:
f is the focal length of the imaging lens assembly LA;
f1 is a focal length of the first lens L1;
R1 is a curvature radius of the object side of the first lens L1;
R2 is a curvature radius of the image side of the first lens L1.

3. The imaging lens assembly LA as claimed in claim 1 further satisfying the following condition (7):

$$-2.00 \leq f2/f \leq -1.10 \tag{7}$$

Where:
f is the focal length of the imaging lens assembly LA;
f2 is a focal length of the second lens L2.

4. The imaging lens assembly LA as claimed in claim 1 further satisfying the following condition (8):

$$-70.00 \leq f3/f \leq -7.00 \tag{8}$$

Where:
f is the focal length of the imaging lens assembly LA;
f3 is a focal length of the third lens L3.

5. The imaging lens assembly LA as claimed in claim 1 further satisfying the following conditions (9)~(10):

$$0.50 \leq f5/f \leq 0.80 \tag{9}$$

$$1.60 \leq (R9+R10)/(R9-R10) \leq 3.00 \tag{10}$$

Where:
f is the focal length of the imaging lens assembly LA;
f5 is a focal length of the fifth lens L5;
R9 is a curvature radius of the object side of the fifth lens L5;

R10 is a curvature radius of the image side of the fifth lens L5.

6. The imaging lens assembly LA as claimed in claim 1 further satisfying the following conditions (11)~(12):

$$-1.00 \leq f6/f \leq -0.40 \quad (11)$$

$$0.05 \leq (R11+R12)/(R11-R12) \leq 0.80 \quad (12)$$

Where:
f is the focal length of the imaging lens assembly LA;
f6 is a focal length of the sixth lens L6;
R11 is a curvature radius of the object side of the sixth lens L6;
R10 is a curvature radius of the image side of the sixth lens L6.

* * * * *